(12) United States Patent
Saito et al.

(10) Patent No.: US 8,190,891 B2
(45) Date of Patent: May 29, 2012

(54) RECEIVER, TRANSMITTER AND COMMUNICATION CONTROL PROGRAM

(75) Inventors: Takeshi Saito, Tokyo (JP); Yoshimitsu Shimojo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 10/599,958

(22) PCT Filed: Sep. 6, 2006

(86) PCT No.: PCT/JP2006/318095
§ 371 (c)(1),
(2), (4) Date: Dec. 14, 2006

(87) PCT Pub. No.: WO2007/029863
PCT Pub. Date: Mar. 15, 2007

(65) Prior Publication Data
US 2008/0192935 A1      Aug. 14, 2008

(30) Foreign Application Priority Data
Sep. 6, 2005   (JP) .................................. 2005-258261

(51) Int. Cl.
*H04L 29/06* (2006.01)
(52) U.S. Cl. ......................................... 713/168; 726/29
(58) Field of Classification Search .................... None
See application file for complete search history.

(56) References Cited

U.S. PATENT DOCUMENTS

| | | | | |
|---|---|---|---|---|
| 6,560,648 B1 * | 5/2003 | Dunn et al. | ................... | 709/224 |
| 7,092,943 B2 * | 8/2006 | Roese et al. | ....................... | 707/9 |
| 7,324,644 B2 * | 1/2008 | Saito | .............................. | 380/200 |
| 7,500,005 B2 * | 3/2009 | Motoyama | ..................... | 709/228 |
| 2002/0025042 A1 * | 2/2002 | Saito | .............................. | 380/258 |
| 2003/0197488 A1 * | 10/2003 | Hulvey | .......................... | 320/135 |
| 2003/0214908 A1 * | 11/2003 | Kumar et al. | .................. | 370/234 |
| 2004/0016000 A1 * | 1/2004 | Zhang et al. | ................... | 725/143 |
| 2004/0142688 A1 * | 7/2004 | Remy | ............................ | 455/423 |
| 2004/0158634 A1 | 8/2004 | Saito et al. | | |
| 2004/0168062 A1 | 8/2004 | Isozaki et al. | | |
| 2005/0027984 A1 | 2/2005 | Saito et al. | | |
| 2005/0097290 A1 * | 5/2005 | Cochran et al. | ............... | 711/165 |
| 2005/0118987 A1 | 6/2005 | Isozaki et al. | | |
| 2005/0160450 A1 * | 7/2005 | Stephens et al. | ................. | 725/35 |
| 2005/0165948 A1 * | 7/2005 | Hatime | .......................... | 709/235 |
| 2005/0169201 A1 * | 8/2005 | Huylebroeck | ................ | 370/311 |

(Continued)

FOREIGN PATENT DOCUMENTS

EP            1182825 A2 *   2/2002
(Continued)

*Primary Examiner* — Nathan Flynn
*Assistant Examiner* — Michael R Vaughan
(74) *Attorney, Agent, or Firm* — Oblon, Spivak, McClelland, Maier & Neustadt, L.L.P.

(57) ABSTRACT

A transmitter has a network interface unit connected to a wireless network capable of transmitting contents for which copyright protection is necessary, an encryption processing unit configured to encrypt contents for which copyright protection is necessary, an RTT measuring unit configured to measure a round trip time after a predetermined packet is transmitted to a receiver, until a response corresponding to the transmitted packet is received, a communication permission determination unit configured to permit transmission of the contents for which copyright protection is necessary when the round trip time measured by the RTT measuring unit is within a predetermined time, and a parameter modification unit configured to change parameters of the wireless network before and/or after the RTT measuring unit performs the measurement of the round trip time.

17 Claims, 9 Drawing Sheets

U.S. PATENT DOCUMENTS

| | | |
|---|---|---|
| 2005/0216724 A1 | 9/2005 | Isozaki et al. |
| 2005/0255864 A1* | 11/2005 | Kent et al. ................. 455/456.5 |
| 2006/0005259 A1 | 1/2006 | Isozaki et al. |
| 2006/0056523 A1* | 3/2006 | Guillotel et al. ............. 375/259 |
| 2008/0043621 A1* | 2/2008 | Hatime ........................ 370/234 |
| 2010/0061236 A1* | 3/2010 | Joshi ............................ 370/231 |
| 2010/0257280 A1* | 10/2010 | Stokking et al. ............. 709/231 |
| 2011/0122771 A1* | 5/2011 | Joshi ............................ 370/236 |

FOREIGN PATENT DOCUMENTS

| | | |
|---|---|---|
| EP | 1 496 660 | 1/2005 |
| WO | WO02062024 A2 * | 8/2002 |
| WO | 2005 010770 | 2/2005 |

* cited by examiner

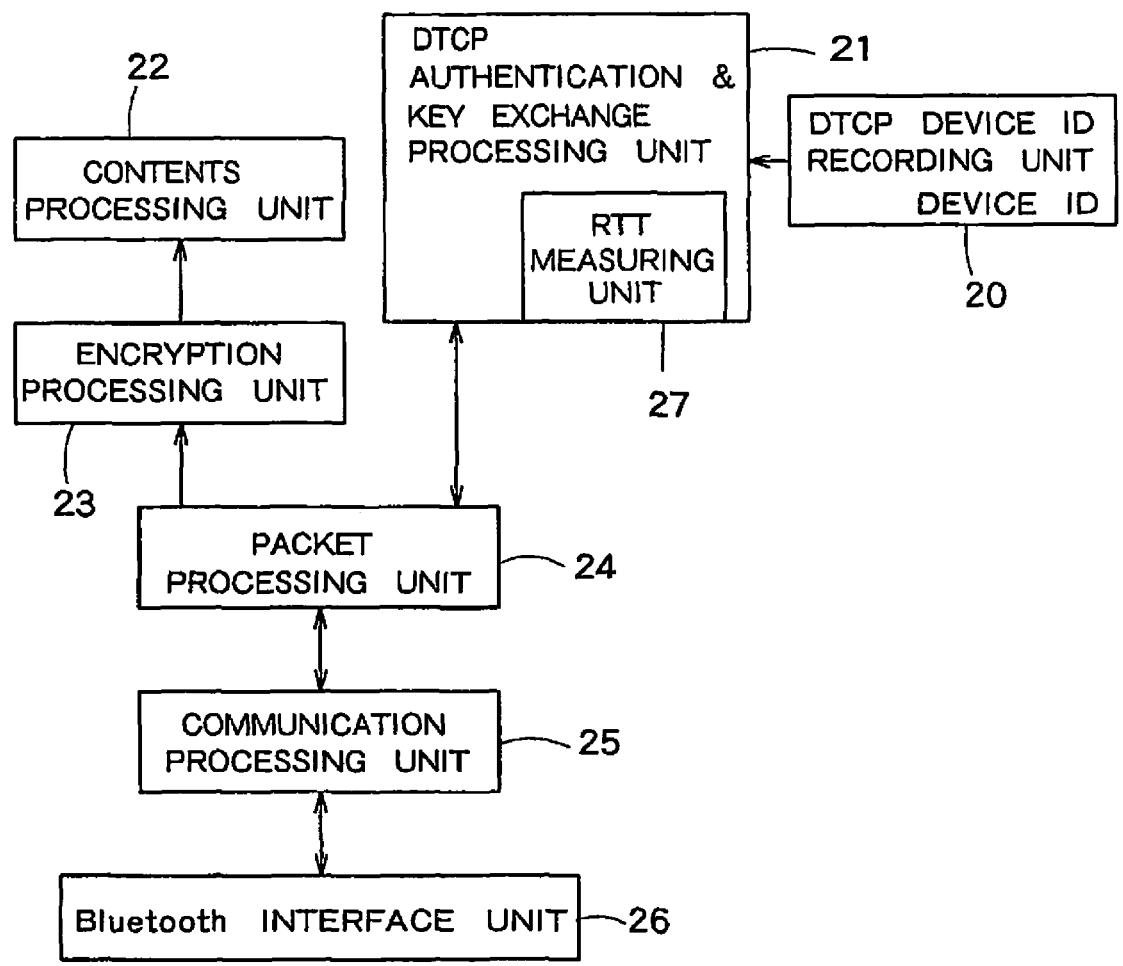
F I G. 3

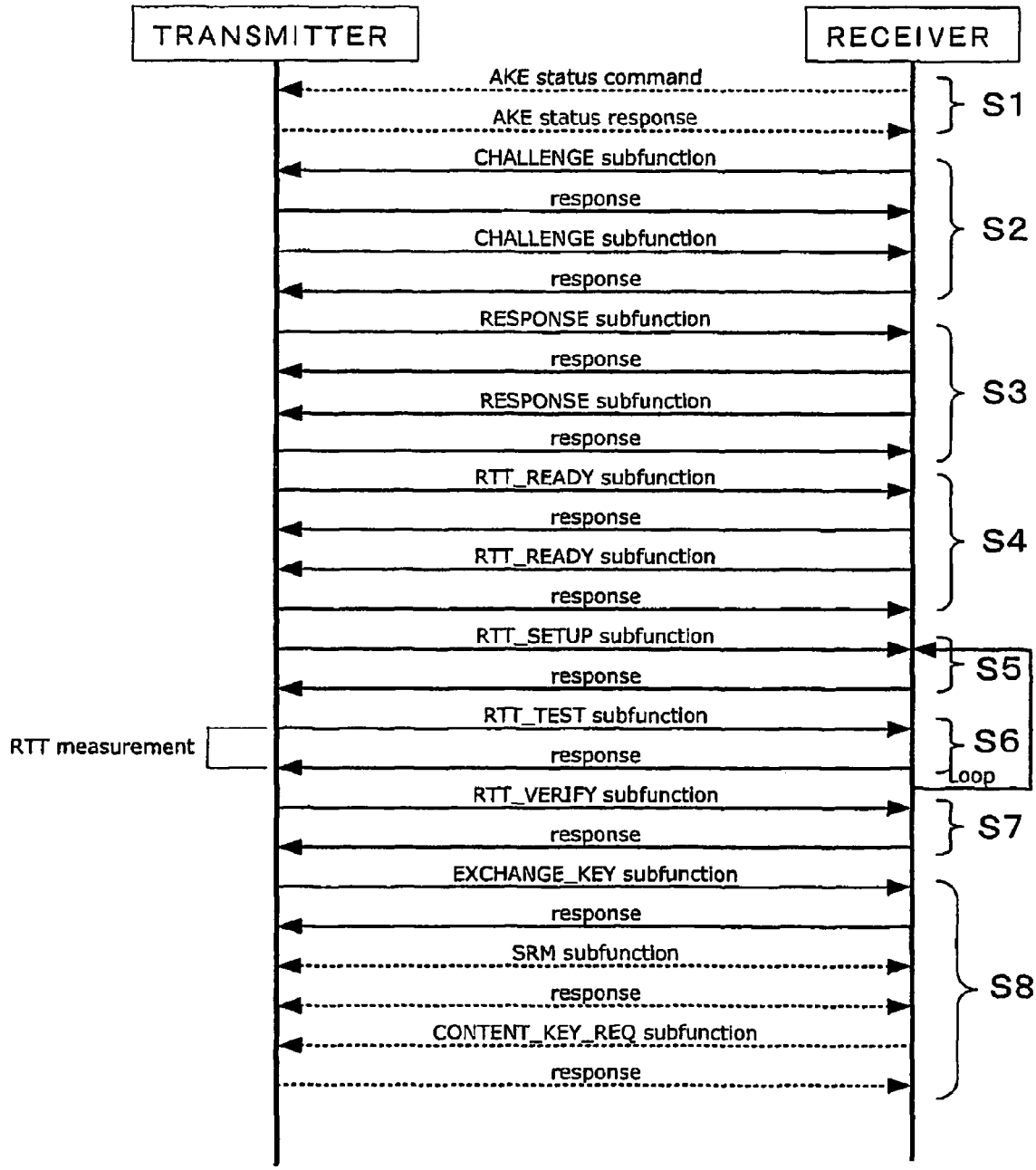
F I G. 4

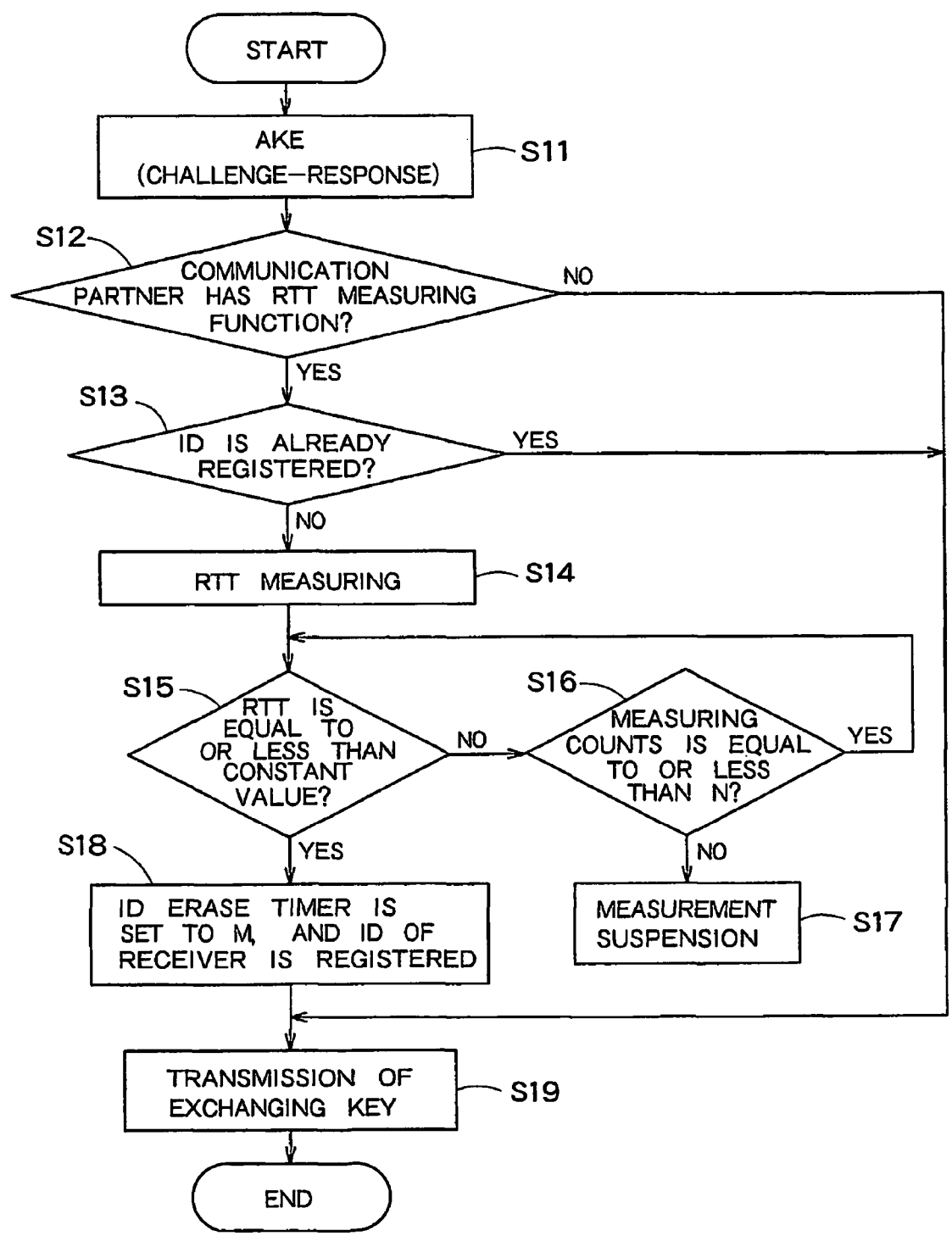
F I G. 5

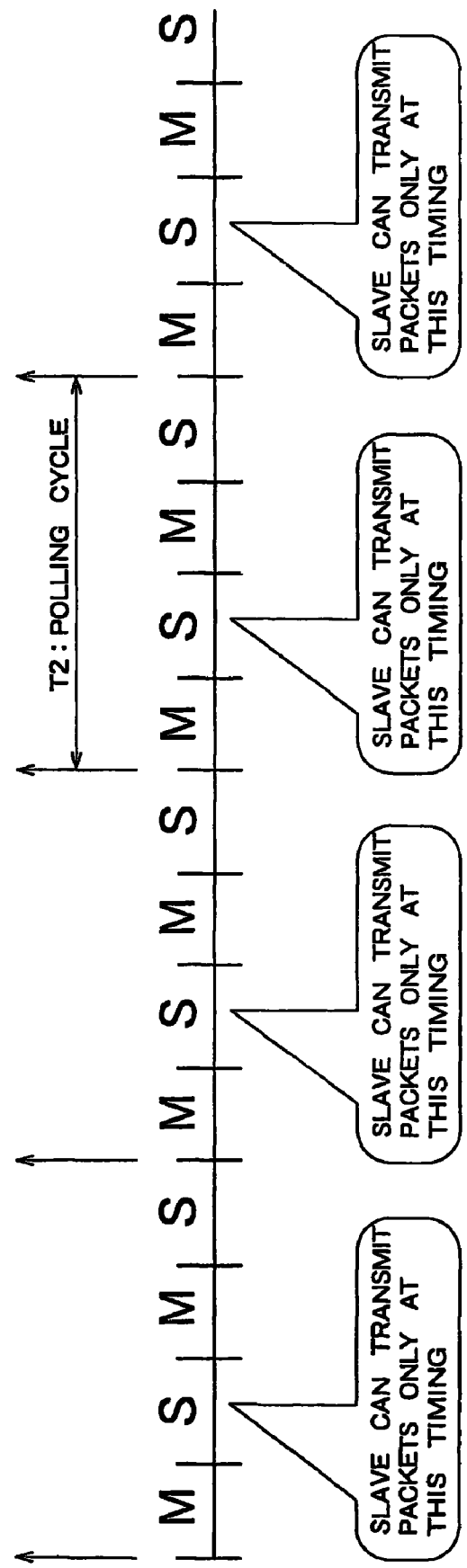
F I G. 8

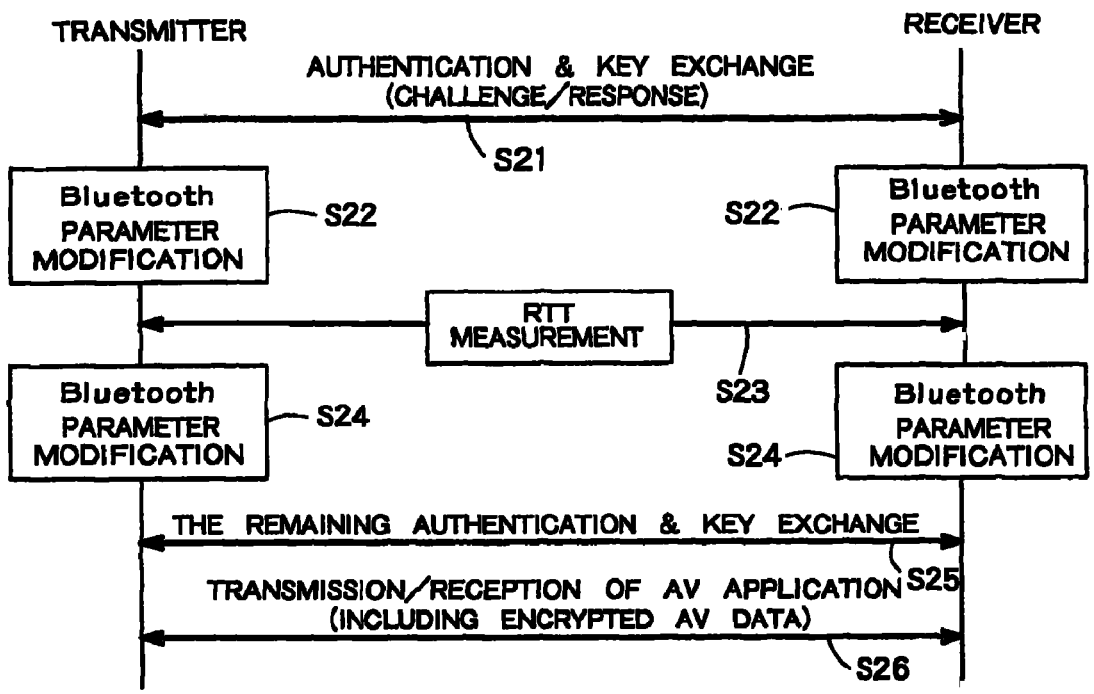
F I G. 9
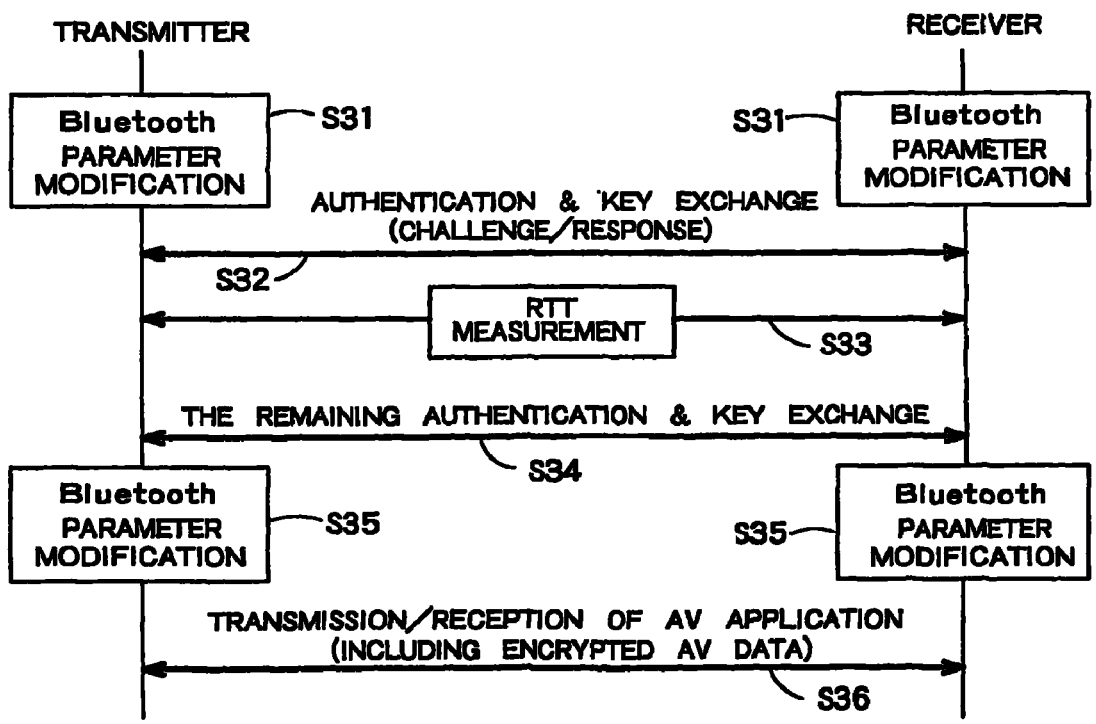
F I G. 10

RECEIVER, TRANSMITTER AND COMMUNICATION CONTROL PROGRAM

BACKGROUND OF THE INVENTION

1. Field of the Invention

The present invention relates to a receiver, a transmitter and a communication control program which communicate contents for which copyright protection is necessary via a wireless network.

2. Related Art

Products called as digital information consumer electronics have increased. It is predicted that these products will be widespread according to the beginning of contents distribution on the Internet. In a category of the digital information consumer electronics, there are included various kinds of products which deal with digital data and digital contents such as a mobile audio player, a digital broadcasting TV, a set top box and a hard disk recorder.

One of problems to be taken into consideration in accordance with spread of these products is copyright protection of contents. Digital data has an advantage in that quality does not deteriorate even if the contents are copied, but has a disadvantage in that illegal copy is easily conducted and copyright protection becomes insufficient.

Because of this, IEEE1394, which is a digital network connecting between digital AV equipments, has an authentication & key exchange function and a data encryption function.

Here, it is assumed to transmit AV data that copyright protection is necessary from a certain transmitter to a receiver. In this case, we have to pay attention that copyright protection relates to transmission of AV data only in a range that each individual person (or in a case of extended interpretation, each family member) enjoys. Transmission and reception of AV data between different persons should not be permitted, as long as permission of a contents provider is not obtained.

As one solution of protecting copyright on a network, there has been known DTCP (Digital Transmission Content Protection).

The DTCP is a copyright protection scheme which has become a de facto standard in IEEE1394, USB, IP and so on. The DTCP performs authentication & key exchange processing between the transmitter and the receiver, to transmit the encrypted AV data (see http://www.dtla.com).

Generally, in order to protect copyright in a transmission system, the AV data is transmitted by the following processing procedure. A command for transmitting and receiving AV data is issued between the transmitter and the receiver. For example, the receiver issues a reproduction command as one of AV control commands to the transmitter.

Subsequently, transmission of AV data from the transmitter to the receiver is begun after AV data is encrypted to protect copyright. Before or after the transmission of AV data, authentication & key exchange processing is performed to protect copyright between the transmitter and the receiver.

When the authentication & key exchange processing is successful, the transmitter and the receiver can share an encryption key of AV data, or calculate the encryption key by themselves. The receiver decrypts the encrypted AV data to reproduce the decrypted AV data.

Procedure of the DTCP is standardized as "DTCP over Bluetooth" even in Bluetooth included in a close range wireless standard. By using the DTCP, it is possible to securely transmit AV data that copyright protection is necessary.

However, progress of recent Internet technology causes new problems. In the Internet, it is possible to transmit and receive arbitrary data between users away an arbitrary distance.

Therefore, it is possible to easily transmit data between Japan and the United States at low cost.

It is possible to encrypt AV data that copyright protection is necessary for each packet. Also it is technically possible to transmit the encrypted packet in a capsulated state on Internet. Accordingly, there is a likelihood that a packet of AV data transmitted by the Bluetooth device which can communicate at only a close range may be converted into an internet capsule to transmit it to a distant location. In this case, if both of the receiver for receiving the internet packet and the Bluetooth device at sending side support the DTCP function, the authentication & key exchange processing is established between both of the receiver and the Bluetooth device, and it is possible to record and reproduce the AV data.

The "DTCP over IP" which prescribes procedure of copyright protection using the internet protocol (IP) adopts an RTT (Round Trip Time) as a technique for performing inside-home communication. More specifically, before or after the authentication & key exchange processing for copyright protection, or along the way of the authentication & key exchange process, the RTT is measured. The RTT is a time period from a time when a specific packet is sent from the transmitter to the receiver, until a time when the specific packet is sent back from the receiver to the transmitter. At this time, the receiver which receives the specific packet may transmit the specific packet as it is, or may include new data in the received specific packet. In this way, if the transmitter can correctly acknowledge a relationship between the transmitted original packet and the received packet, there is no particular limitation to a format of the packet sent back by the receiver. The transmitter measures the RTT, and if the measured value is equal to or less than a constant value, the transmitter can determine that the receiver is located in close range, i.e. the receiver is located inside the home. Therefore, it is possible to prevent transmission of AV data at a long distance.

SUMMARY OF THE INVENTION

The present invention provides a receiver, a transmitter and a communication control program which can surely limit a transmission range of contents to protect copyright of contents when contents are transmitted by using a wireless network.

According to one embodiment of the present invention, a transmitter, comprising:

a network interface unit connected to a wireless network capable of transmitting contents for which copyright protection is necessary;

an encryption processing unit configured to encrypt contents for which copyright protection is necessary;

an RTT measuring unit configured to measure a round trip time after a predetermined packet is transmitted to a receiver, until a response corresponding to the transmitted packet is received;

a communication permission determination unit configured to permit transmission of the contents for which copyright protection is necessary when the round trip time measured by the RTT measuring unit is within a predetermined time; and a parameter modification unit configured to change parameters of the wireless network before and/or after the RTT measuring unit performs the measurement of the round trip time.

According to one embodiment of the present invention, a receiver, comprising:

a network interface unit connected to a wireless network capable of receiving contents for which copyright protection is necessary;

an encryption processing unit configured to decrypt contents for which copyright protection is necessary;

an RTT measuring unit configured to measure a round trip time after a predetermined packet is transmitted to a transmitter, until a response corresponding to the transmitted packet is received;

a communication permission determination unit configured to permit reception of contents for which copyright protection is necessary when the round trip time measured by the RTT measuring unit is within a predetermined time; and a parameter modification unit configured to change parameters of the wireless network before and/or after the RTT measuring unit performs the measurement.

According to one embodiment of the present invention, a communication control program, comprising:

measuring a round trip time after a predetermined packet is transmitted to the other communication apparatus, until a response corresponding to the transmitted packet is received;

permitting transmission or reception of contents for which copyright protection is necessary when the measured round trip time is within a predetermined time;

transmitting or receiving the encrypted contents via a wireless network when transmission or reception of the contents is permitted; and changing parameters of the wireless network before and/or after the round trip time is measured.

BRIEF DESCRIPTION OF THE DRAWINGS

FIG. 3 is a block diagram showing one example of internal configuration of the receiver in FIG. 1.

FIG. 4 is a sequence diagram showing a detailed procedure of the RTT measuring units 17 and 27.

FIG. 5 is a flowchart showing one example of the RTT measurement processing performed by the RTT measuring unit 17 in the transmitter 1.

FIG. 8 is a diagram explaining a polling interval.

FIG. 9 is a sequence diagram showing a first example of a timing of changing the Bluetooth parameters.

FIG. 10 is a sequence diagram showing a second example of a timing of changing the Bluetooth parameters.

DETAILED DESCRIPTION OF THE INVENTION

Hereafter, a receiver and a receiving method according to the present invention will be described more specifically with reference to the drawings.

(First Embodiment)

Figure 1:
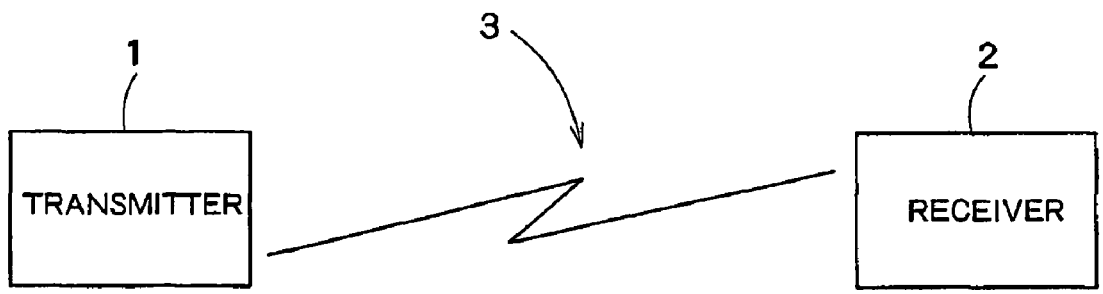
FIG. 1 is a diagram showing a connection relationship between a transmitter and a receiver according to a first embodiment.

FIG. 1 is a diagram showing a connection relationship between a transmitter and a receiver according to a first embodiment. As shown in FIG. 1, the transmitter 1 and the receiver 2 perform a close range wireless communication via a wireless network 3 based on a Bluetooth standard.

Each of the transmitter 1 and the receiver 2 implements a Bluetooth AV profile and "DTCP over Bluetooth" which prescribes procedure of copyright protection for Bluetooth. Here, the Bluetooth AV profile is a stipulation for transmitting audio and video on Bluetooth and for performing command control. The "DTCP over Bluetooth" implements an RTT measurement scheme for performing inside-home communication.

Figure 2:
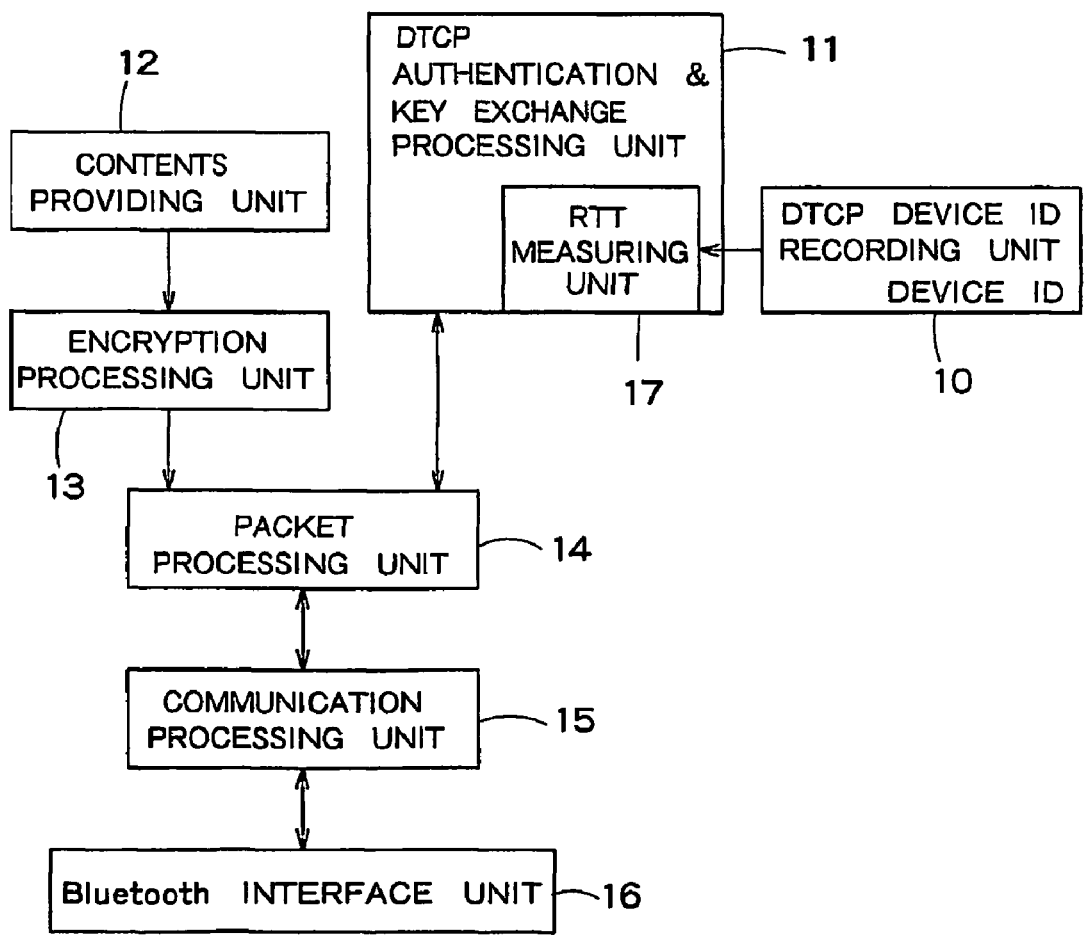
FIG. 2 is a block diagram showing one example of internal configuration of the transmitter 1 in FIG. 1.

FIG. 2 is a block diagram showing one example of internal configuration of the transmitter 1 in FIG. 1. FIG. 3 is a block diagram showing one example of internal configuration of the receiver in FIG. 1. The transmitter 1 of FIG. 2 has a DTCP device ID recording unit 10, a DTCP authentication & key exchange processing unit 11, a contents providing unit 12, an encryption processing unit 13, a packet processing unit 14, a communication processing unit 15 and a Bluetooth interface unit 16. The receiver 2 of FIG. 3 has a DTCP device recording unit 20, a DTCP authentication & key exchange processing unit 21, a contents processing unit 22, an encryption processing unit 23, a packet processing unit 24, a communication processing unit 25, and a Bluetooth interface unit 26.

The DTCP device ID register units 10 and 20 record a DTCP device ID expressing a unique ID which is provided by a DTCP certification organization and included in its own certificate, an ID expressing its own Bluetooth address or an ID expressing a communication partner such as a Bluetooth address of the communication partner. The DTCP authentication & key exchange processing units 11 and 21 perform the authentication & key exchange processing with the other communication apparatus corresponding to the communication partner, hereinafter called as a communication partner apparatus. The DTCP authentication & key exchange processing units 11 and 21 have RTT measuring units 17 and 27 which perform measurement of RTT, respectively.

The contents processing unit 22 performs processing for extracting contents from the received data. The contents providing unit 12 acquires the contents to be transmitted and provides the acquired contents to the encryption processing unit 13. The encryption processing units 13 and 23 perform encryption or decryption of the packets. The packet processing units 14 and 24 perform generation or decomposition of the packets. The communication processing units 15 and 25 perform modulation/demodulation processing, error correction processing, base band processing and so on of the transmitted and received packets. The Bluetooth interface units 16 and 26 set various parameters of Bluetooth to send out communication data to the wireless network 3 and to receive the packets from the wireless network 3.

FIG. 4 is a sequence diagram showing a detailed procedure of the RTT measuring units 17 and 27. Hereinafter, an example in which the transmitter 1 performs the RTT measurement processing will be described. Contrary, the receiver 2 may perform the RTT measurement processing of the transmitter 1. In this case, if the RTT measurement is successful, the receiver 2 notifies the transmitter of success of measurement.

First of all, the transmitter 1 transmits and receives the command for the authentication & key exchange processing with the receiver 2 (step S1). Subsequently, a preliminary preparation for the authentication & key exchange processing is performed (step S2). Here, certificates and random numbers are transmitted and received to/from each other to verify the respective certificates. The certificates include descriptions as to whether the transmitter 1 and the receiver 2 have the RTT measurement function. Accordingly, by referring to the certificate transmitted from the receiver 2, it is possible to detect whether or not the receiver 2 has the RTT measurement function.

When the receiver 2 has the RTT measurement function, the RTT measurement is performed. If the receiver 2 has been registered to the DTCP device ID register unit 10 in the transmitter 1, it is determined that the RTT has been already calculated, and the RTT measurement is omitted.

When the processing of step S2 is completed, parameters used for generating the key in the authentication & key exchange processing are exchanged (step S3). The parameters are values of first phase of Diffie-Hellman using an elliptic curve. Subsequently, a preliminary preparation processing for the RTT measurement is performed (step S4). Here, RTT_Ready commands indicating that preparation for the RTT measurement is ready are exchanged to each other.

Subsequently, the transmitter 1 transmits RTT_Setup command informing the receiver 2 of the beginning of the RTT measurement, and the receiver 2 sends back the response for the RTT_Setup command to the transmitter 1 (step S5).

Subsequently, the RTT measurement is begun, and the transmitter 1 transmits RTT_Test command to the receiver 2. The receiver 2 which has received the RTT_Test command responds at once (step S6). The transmitter 1 measures a time period from a time of transmitting the RTT_Test command until at time of receiving the response. Subsequently, the transmitter 1 transmits RTT_Verify command to the same receiver 2 to verify whether or not the RTT measurement has been performed, and the receiver 2 sends back the response (step S7).

Subsequently, the transmitter 1 and the receiver 2 perform the remaining processing of the authentication & key exchange processing suspended along the way (step S8).

As a result of performing the RTT measurement in step S6, if the RTT is equal to or less than a predetermined value, it is determined that the receiver 2 is located inside the home, i.e. near the transmitter 1, and the transmitter 1 registers a device ID of the receiver 2 to the DTCP device ID recording unit 20. The registered device ID may be invalidated after M hours have been passed. Therefore, there is no likelihood that the registered device ID is illegally acquired by some means to make inappropriate use. Furthermore, due to radio wave status, trouble of the receiver 2 and so on, there is a possibility that the RTT measurement is not temporarily performed correctly. Therefore, the RTT measurement may be repeatedly performed multiple numbers of times.

FIG. 5 is a flowchart showing one example of the RTT measurement processing performed by the RTT measuring unit 17 in the transmitter 1. First of all, the authentication & key exchange processing is begun (step S11). Subsequently, it is determined that the receiver 2 has the RTT measurement function (step S12). When the receiver 2 has the RTT measurement function, it is determined whether or not the device ID of the receiver 2 is registered in the DTCP device ID register unit 10 (step S13).

When it is determined that the receiver has not yet been registered in step S13, the RTT measurement is performed (step S14). A detailed procedure of the RTT measurement will be described later.

After performing the RTT measurement, it is determined whether or not the RTT is equal to or less than a predetermined value (step S15). If the RTT is larger than the predetermined value, it is determined whether or not measurement counts are equal to or less than N (step S16). If the measurement counts are equal to or less than N, the processing returns to step 514 to perform the RTT measurement again. If the RTT does not become equal to or less than the predetermined value even if the RTT measurement is performed N times, a suspending process the RTT measurement is performed (step S17).

If it is determined that the RTT is equal to or less than the predetermined value in step S15, the device ID of the receiver 2 is registered to the DTCP device ID recording unit 10. A timer measurement is begun (step S18). When a measuring time by the timer measurement reaches a predetermined time M, the registered device ID is automatically deleted from the DTCP device ID recording unit 20.

When it is determined in step S12 that the receiver 2 does not have the RTT measurement function, when it is determined in step S13 that the receiver 2 has already been registered to the DTCP device ID register unit 10, or when the register of the device ID has been completed in step 518, the remaining processing of the authentication & key exchange processing is performed with the receiver 2 to exchange the key (step S19).

According to the present embodiment, when performing wireless communication under the standard of Bluetooth, the RTT measurement is performed to protect copyright of the contents. In this case, there are matters to be taken into consideration as a unique characteristic of Bluetooth.

(1) Sniff Mode

Bluetooth is often implemented to equipment which requires low power consumption such as a cellular phone and the other mobile devices. Therefore, Bluetooth standardizes various schemes for realizing low power consumption. One of the schemes is the sniff mode. Bluetooth is a network technique for performing one-to-many communication. A source node in that network is called as a master, and the other branch nodes are called as slaves.

Figure 6:
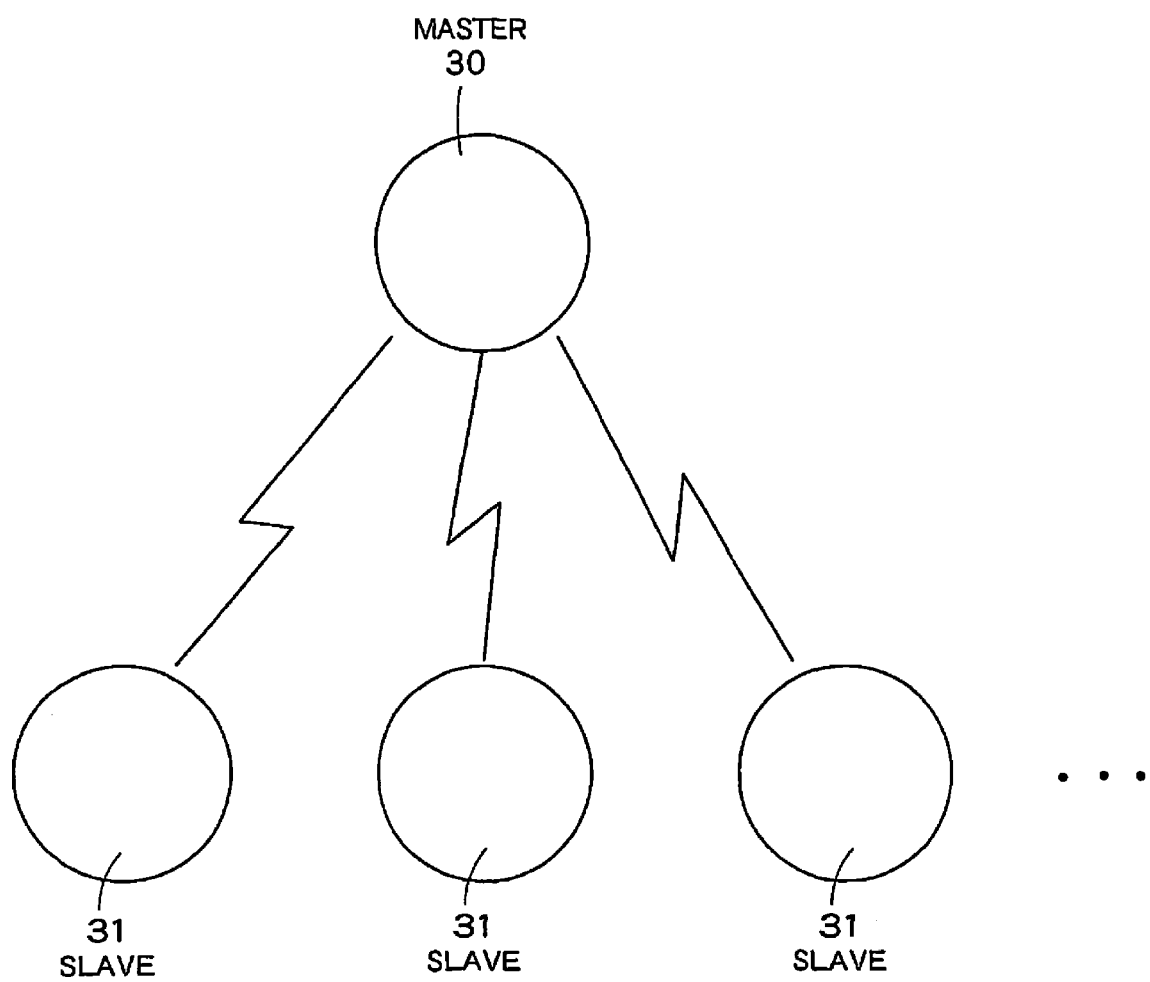
FIG. 6 is a diagram showing a connection relationship between the master 30 and the slaves 31.
Figure 7:
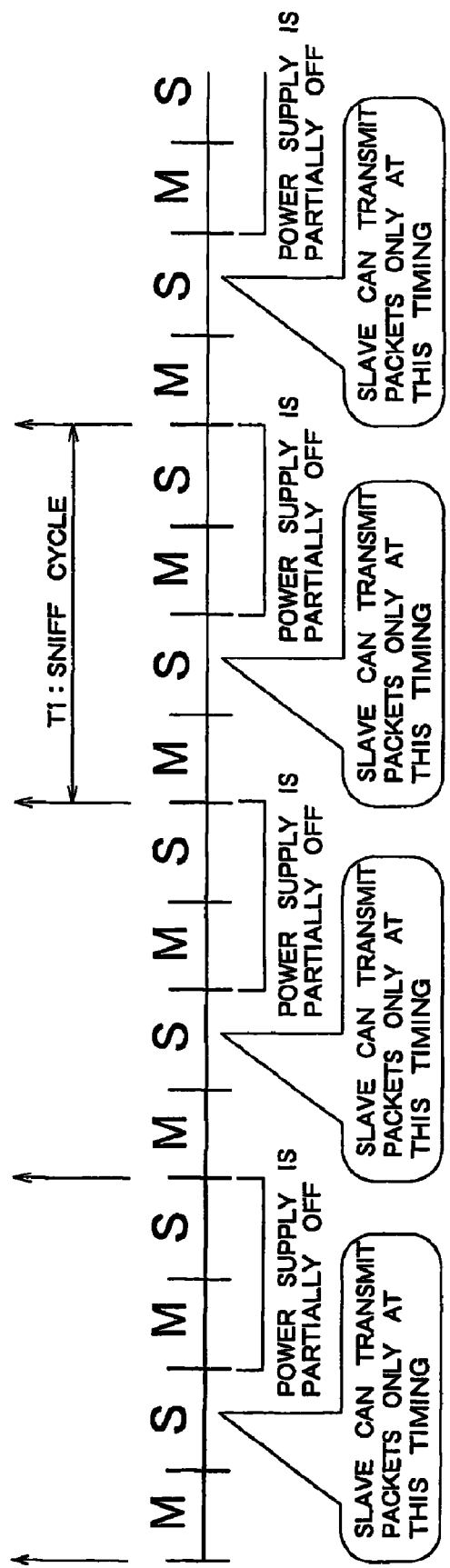
FIG. 7 is a diagram explaining the sniff mode.

FIG. 6 is a diagram showing a connection relationship between the master 30 and the slaves 31, and FIG. 7 is a diagram explaining the sniff mode. Each of the slaves 31 communicates with the master by wireless. The sniff mode is a low power consumption mode unique to the slaves 31. Time slots, which is also called as sniff slots, are provided for every constant interval, and transmission and reception of the packets are limited in these time slots.

Each interval of scales in FIG. 7 expresses a transmission cycle of the packet by the master 30 or the slaves 31. "M" expresses the transmission cycle allocated to the master 30, and "S" expresses the transmission cycle allocated to the slaves. The master 30 and the slaves 31 are permitted to transmit the packets only within the sniff cycle T1 determined in advance. FIG. 7 shows the sniff cycle T1 of a certain slave 1. Arrows of FIG. 7 become a transmission timing of the slave 31.

The slave 31 operated in the sniff mode receives the packets within the sniff cycle T1. When the address set to the packet header is not its own address, the reception of the packet is suspended along the way, and the slave waits for the subsequent sniff cycle T1.

On the other hand, when the received packet is for its own, as long as the transmission packet from the master 30 exists, the packets are received successively. At this time, in the time slot just after the time slot in the sniff cycle T1 which has received the packet, it is possible to transmit the packet to the master 30. When the time slot is not within the sniff cycle, transmission and reception of the packets are suspended in principle, thereby lowering power consumption.

In this way, the slaves 31 operating in the sniff mode communicate with the master 30 only within the sniff cycle T1. Therefore, even if the slave 31 receives the packets for the RTT measurement from the master 30, it is impossible to send back the response to the master 30 until the subsequent sniff cycle. Because of this, there is likelihood that the RTT value may become very large.

Therefore, according to the present embodiment, when performing the RTT measurement, the sniff cycle T1 is shortened, and response of the packet for the RU measurement is quickly sent back.

The sniff cycle T1 is set in the Bluetooth interface units 16 and 26 in FIGS. 2 and 3. More specifically, the sniff cycle can be changed by using an HCI (Host Controller Interface) command expressing API for setting hardware of the Bluetooth device or a LMP (Link layer Management Protocol) command. For example, by issuing the LMP command (LMP_sniff_req) by the Bluetooth interface unit 16, it is possible to change the value of the sniff cycle T1. Therefore, the Bluetooth interface units 16 and 26 issue the above command to temporarily shorten the sniff cycle T1 when performing the RTT measurement, thereby correctly performing the RTT measurement.

(2) Polling Interval

On the other hand, in the cellular phone, which is the most popular device that Bluetooth is implemented, voice communication is Inevitable, and it is necessary to maintain quality (QoS) of the network. Therefore, various schemes for improving QoS are implemented in the standard of Bluetooth. One of the schemes is polling. The polling gives a chance of packet transmission to the slaves 31 at least once during a constant period to obtain QoS more than a predetermined value. The cycle of the polling is called as a polling interval.

FIG. 8 is a diagram explaining a polling interval. As shown in FIG. 8, time slots are allocated for the respective master 30 and slaves 31. Each slave 31 performs wireless communication with the master 30 only within the polling cycle. If the polling interval T2 is long, when a certain slave 31 receives the packet for the RTT measurement, the response for the received packet has to wait until the subsequent polling. Therefore, the waiting time becomes long, and as a result, the RUT measurement value becomes large.

According to the present embodiment, in order to decrease the RTT measurement value, the polling interval T2 is shortened at the RTT measuring time. The Bluetooth interface unit 16 of FIGS. 2 and 3 performs modification of the polling interval T2. More specifically, the modification can be performed by using the HCI command expressing API for setting hardware of the Bluetooth device and the LMP command. For example, it is possible to modify the polling cycle by issuing the LMP command (LMP_quality_of_service) by the Bluetooth interface unit 16.

(3) Wireless Transmission Power

According to the standard of Bluetooth, there are some modes relating to wireless transmission power intensity. That is, there are some modes called as classes. Class 1 expresses that wireless radio field intensity is strong (even in a distance of 100 m, it is possible to communicate between the transmitter 1 and the receiver 2), and class 2 expresses that wireless radio field intensity is weak (only within a distance of 5-10 m, it is possible to communicate between the transmitter 1 and the receiver 2). As a scheme of ensuring that the transmitter 1 and the receiver 2 are located adjacent to each other, it is more desirable to use the radio field intensity of class 2 than that of class 1.

Accordingly, when performing transmission of contents for which copyright protection is necessary, it is desirable to use the radio field intensity of class 2 between the transmitter 1 and the receiver 2 to weaken the radio transmission power intensity.

(4) Master Slave Exchange

As shown in FIG. 6, each device for communicating by Bluetooth has a role called as the master 30 or the slave 31. The master 30 has a control function of the Bluetooth network (called as a Bluetooth piconet). All the other devices connected to the Bluetooth network are the slaves 31. The slaves of maximum seven devices can communicate with one master 30.

Control function for the master 30 is, for example, to allocate the time slots for the respective slaves. In Bluetooth, the master 30 performs allocation of the time slots. In order to fulfill requirement for decreasing the RTT measurement value as small as possible by sending back the RTT response at once, it is desirable to provide configuration that the receiver 2 for transmitting the RTT response becomes the master 30. If the receiver 2 is the master 30, at a time of receiving the RTT command from the transmitter 1, the time slot can be controlled so as to send back the response to the transmitter 1.

Generally, it is impossible to predict which of the transmitter 1 or the receiver 2 becomes the master 30. Because of this, according to the standard of Bluetooth, a scheme called as master slave exchange is provided to exchange roles of the master 30 and the slaves 31. By using the scheme, the transmitter 1 can become the slave 31, and the receiver 2 can become the master 30. On the contrary, the transmitter 1 can become the master 30, and the receiver 2 can become the slave 31.

By using this scheme, during the RTT measurement period, a device which receives the RTT command and sends back the response, for example, the receiver 2, may be set to the master 30. Therefore, the receiver 2 can allocate the time slots for itself at a time point of receiving the RTT command, and can soon send back the response to transmitter 1. As a result, the RTT value becomes small.

As described above, when performing the RTT measurement, it is desirable to change in advance the Bluetooth parameters such as (1) the sniff mode, (2) the polling interval T2; (3) the wireless transmission power and (4) the master slave exchange. It is unnecessary to change all the parameters of the above (1) to (4). Even if only a portion of the parameters (1) to (4) is changed, it is possible to relatively precisely measure the RTT. Hereinafter, a timing of changing these parameters will be described in detail below.

FIG. 9 is a sequence diagram showing a first example of a timing of changing the Bluetooth parameters.

In FIG. 9, after the authentication & key exchange processing is begun (step S21), the Bluetooth parameters for the RTT measurement are changed (step S22). Here, the Bluetooth parameters include at least one of the above (1) to (4). More specifically, when the sniff cycle T1 is changed, the sniff cycle T1 is changed to be small so as to be able to quickly send back the response to the transmitter 1. When the polling interval T2 is changed, the polling interval T2 is changed to be small in the same way. When the wireless transmission power is changed, the radio field intensity is weakened so as to be able to transmit the packets only within a close range. When performing the master slave exchange, the receiver 2 for receiving the RTT packet is set to the master 30, and control authority of the timing slots is given to the receiver 2.

Afterward, the RTT measurement is begun (step S23). When the RTT measurement is completed, the Bluetooth parameters are put back (step S24). And then the remaining processing of the authentication & key exchange processing is performed (step S25). When the authentication & key exchange processing is successful, AV application is started up, and the AV contents for which copyright protection is necessary are transmitted and received in the AV application (step S26).

FIG. 10 is a sequence diagram showing a second example of a timing of changing the Bluetooth parameters. Before beginning the authentication & key exchange processing, the Bluetooth parameters are changed for the RTT measurement (step S31). Subsequently, the authentication & key exchange processing is performed (step S32). Along the way of the processing, the RTT measurement is performed (step S33). Subsequently, the remaining processing of the authentication & key exchange processing is performed (step S34). These steps S32 to S34 are performed in the same procedure as that of FIGS. 4-5.

When the authentication & key exchange processing is successful, the Bluetooth parameters changed in step S3.1 are put back (step S35). And then the AV application is started up, and the AV contents are transmitted (step S36).

Figure 11:
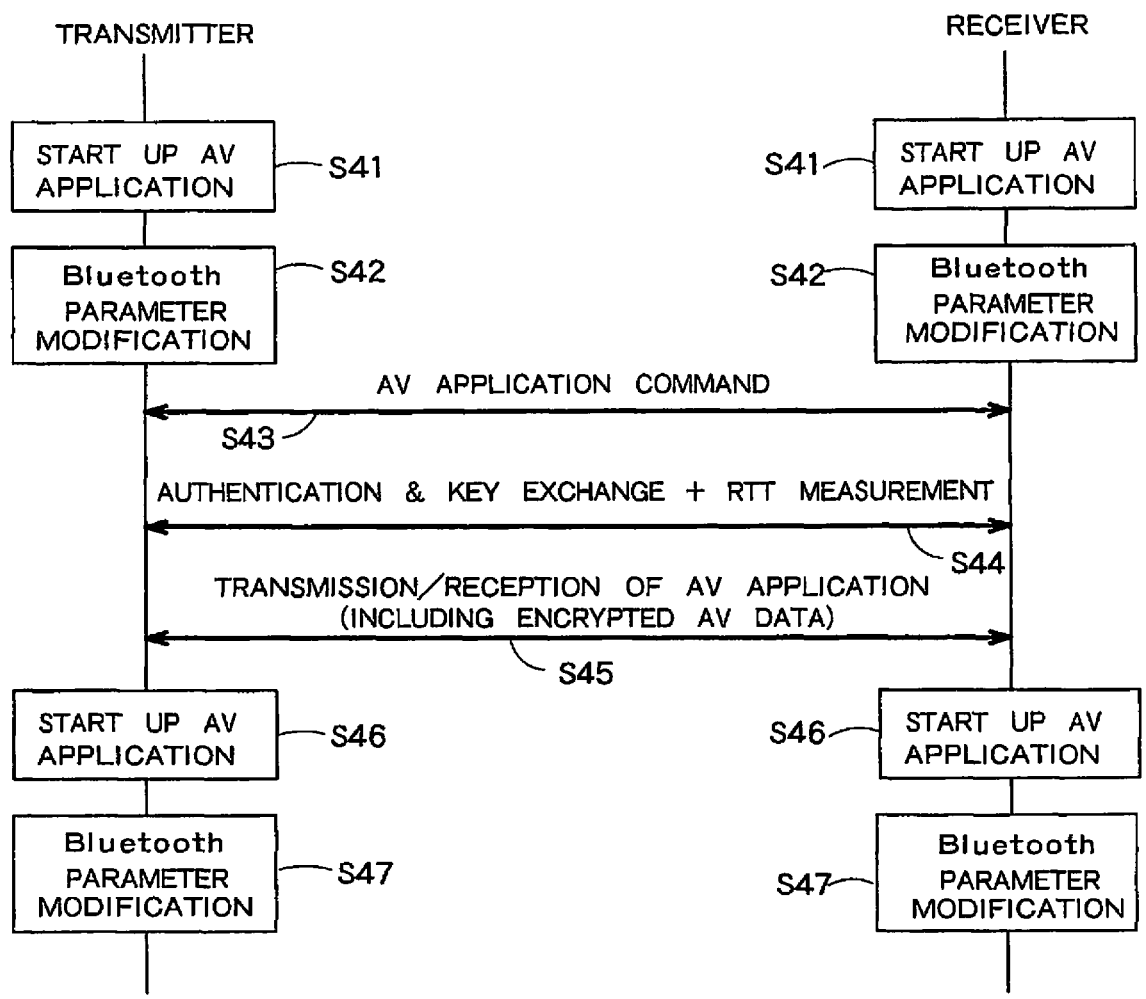
FIG. 11 is a sequence diagram showing a third example of a timing of changing the Bluetooth parameters.

FIG. 11 is a sequence diagram showing a third example of a timing of changing the Bluetooth parameters. First of all, the AV application is started up (step S41). Subsequently, in the same way as step S22, the Bluetooth parameters for the RTT measurement are changed (step S42). Subsequently, the commands of the AV application are transmitted and received between the transmitter 1 and the receiver 2 (step S43).

Subsequently, the authentication & key exchange processing is performed, and the RTT measurement is performed in the processing (step S44). The step S44 is performed in the same procedure as that of FIGS. 4-5. When the authentication & key exchange processing is normally completed, the processing of the AV application including the transmission of the AV contents is performed (step 545).

Subsequently, after the AV application is completed, the Bluetooth parameters are put back (step S47).

In FIGS. 9-11, the RTT measurement is performed along the way of the authentication & key exchange processing based on the processing procedure of FIGS. 4-5. However, the RTT measurement may be performed before or after the authentication & key exchange processing. For example, if the authentication & key exchange processing is performed after the RTT measurement is performed, it is possible to permit the beginning of the authentication & key exchange processing only when the RTT measurement is successful, and it is unnecessary to perform the authentication & key exchange processing in vain. Furthermore, if the RTT measurement is performed after performing the authentication & key exchange processing, it is possible to omit the RTT measurement when the authentication & key exchange processing is not successful, and it is unnecessary to perform the RTT measurement in vain. In this case, for example, when the authentication & key exchange processing is successful, but the RTT measurement is unsuccessful, the processing which does not permit the use of the encryption key obtained by the authentication & key exchange processing is performed.

In FIGS. 9-11, the example of integrally performing the processing of changing the wireless parameters has been described. The timings of changing the wireless parameters may be individually set for each parameter. That is, modification of a partial parameter may be performed at a timing of FIG. 9, and modification of the other parameter may be performed at a timing of FIG. 11.

As described above, according to the present embodiment, when the contents for which copyright protection is necessary is transmitted and received via the wireless network 3 of Bluetooth, before beginning the RTT measurement, in order to limit the range of transmission of the contents, the Bluetooth parameters are changed to correctly perform the RTT measurement. Therefore, it is possible to transmit the contents only within a range restricted physically such as inside-home. Accordingly, even when the wireless network 3 of Bluetooth is used, it is possible to protect copyright of the contents. Especially, according to the present embodiment, even when the transmitter 1 and the receiver 2 discretely communicate with each other by using the sniff mode or the polling interval unique to Bluetooth, it is possible to correctly measure the RTT, and to precisely and easily determine whether the transmission of the contents should be permitted.

At least a portion of functions performed by the above-mentioned transmitter 1 and receiver 2 may be constituted by at least one of hardware and software. When constituted by software, a program of executing at least a portion of the functions performed by the transmitter 1 and the receiver 2 is stored in a recording media such as a floppy disk or CD-ROM, and is loaded to a computer to execute its program. The recording media is not limited to a portable media such a magnetic disk or an optical disk, but a fixed recording media such as a hard disk drive or a memory may be used to store the program.

The program of executing at least a portion of the functions performed by the transmitter 1 and the receiver 2 may be distributed via a communication line such as Internet. The program may be distributed via a wired line or a wireless line such as Internet at a state of encrypting, modulating or compressing the program, or may be distributed at a state of being stored in the recording media.

The invention claimed is:

1. A transmitter, comprising:
   a network interface unit connected to a wireless network capable of transmitting contents for which copyright protection is necessary;
   an encryption processing unit configured to encrypt contents for which copyright protection is necessary;
   an RTT measuring unit configured to measure a round trip time after a predetermined packet is transmitted to a receiver, until a response corresponding to the predetermined packet is received;
   a communication permission determination unit configured to permit transmission of the contents for which copyright protection is necessary when the round trip time measured by the RTT measuring unit is within a predetermined time; and
   a parameter modification unit configured to change parameters of the wireless network, before the RTT measuring unit measures the round trip time, the parameters improving accuracy of the round trip time when the RTT measuring unit measures the round trip time,
   wherein the wireless network is Bluetooth; and
   the parameter modification unit changes at least one of a sniff interval expressing transmission and reception interval, a polling interval, transmission power and master-slave exchange prescribed by a standard of Bluetooth as parameters.

2. The transmitter according to claim 1, further comprising an authentication & key exchange unit configured to perform authentication & key exchange processing with the receiver;
   wherein the parameter modification unit changes the parameters to measure the round trip time when the authentication & key exchange unit performs the authentication & key exchange processing, and restores the parameters after the measurement of the round trip time is completed, before the authentication & key exchange unit completes the authentication & key exchange processing.

3. The transmitter according to claim 1, further comprising an authentication & key exchange unit configured to perform authentication & key exchange processing with the receiver;
wherein the parameter modification unit changes the parameters to measure the round trip time when the authentication & key exchange unit performs the authentication & key exchange processing, and restores the parameters after the authentication & key exchange unit completes the authentication & key exchange processing.

4. The transmitter according to claim 1, further comprising an authentication & key exchange unit configured to perform authentication & key exchange processing with the receiver;
wherein the parameter modification unit changes the parameters to measure the round trip time before transmission of commands relating to contents for which copyright protection is necessary is begun, and restores the parameters after transmission processing of contents for which copyright protection is necessary is completed.

5. The transmitter according to claim 1,
wherein the parameter modification unit sets the sniff interval shorter than a normal interval when the RTT measuring unit performs the measurement.

6. The transmitter according to claim 1,
wherein the parameter modification unit sets the polling interval shorter than a normal interval when the RTT measuring unit performs the measurement.

7. The transmitter according to claim 1,
wherein the parameter modification unit sets a transmission power weaker than a normal power when the RTT measuring unit performs the measurement.

8. The transmitter according to claim 1,
wherein the parameter modification unit reverses roles of a master device and a slave device when the RTT measuring unit performs the measurement.

9. A receiver, comprising:
a network interface unit connected to a wireless network capable of receiving contents for which copyright protection is necessary;
an encryption processing unit configured to decrypt contents for which copyright protection is necessary;
an RTT measuring unit configured to measure a round trip time after a predetermined packet is transmitted to a transmitter, until a response corresponding to the predetermined packet is received;
a communication permission determination unit configured to permit reception of contents for which copyright protection is necessary when the round trip time measured by the RTT measuring unit is within a predetermined time; and
a parameter modification unit configured to change parameters of the wireless network, before the RTT measuring unit measures the round trip time, the parameters improving accuracy of the round trip time when the RTT measuring unit measures the round trip time,
wherein the wireless network is Bluetooth; and
the parameter modification unit changes at least one of a sniff interval expressing transmission and reception interval, a polling interval, transmission power and master-slave exchange prescribed by a standard of Bluetooth as parameters.

10. The receiver according to claim 9, further comprising an authentication & key exchange unit configured to perform the authentication & key exchange processing with the transmitter,
wherein the parameter modification unit changes the parameters to measure the round trip time when the authentication & key exchange unit performs the authentication & key exchange, and restores the parameters after the measurement of the round trip time is completed, before the authentication & key exchange unit completes the authentication & key exchange processing.

11. The receiver according to claim 9, further comprising an authentication & key exchange unit configured to perform the authentication & key exchange processing with the transmitter;
wherein the parameter modification unit changes the parameters to measure the round trip time before the authentication & key exchange unit begins the authentication & key exchange processing, and restores the parameters after the authentication & key exchange unit completes the authentication & key exchange processing.

12. The receiver according to claim 9, further comprising an authentication & key exchange unit configured to perform the authentication & key exchange processing with the transmitter,
wherein the parameter modification unit changes the parameters to measure the round trip time before beginning transmission of commands relating to transmission of contents for which copyright protection is necessary, and restores the parameters after transmission processing of contents for which copyright protection is necessary is completed.

13. The receiver according to claim 9,
wherein the parameter modification unit sets the sniff interval shorter than a normal interval when the RTT measuring unit performs the measurement.

14. The receiver according to claim 9,
wherein the parameter modification unit sets the polling interval shorter than a normal interval when the RTT measuring unit performs the measurement.

15. The receiver according to claim 9,
wherein the parameter modification unit sets a transmission power weaker than a normal power when the RTT measuring unit performs the measurement.

16. The receiver according to claim 9,
wherein the parameter modification unit reverses roles of a master device and a slave device when the RTT measuring unit performs the measurement.

17. A non-transitory computer readable recording medium for storing a communication control program, the program, when executed, causes a computer to perform a method comprising:
measuring a round trip time after a predetermined packet is transmitted to the other communication apparatus, until a response corresponding to the predetermined packet is received;
permitting transmission or reception of contents for which copyright protection is necessary when the measured round trip time is within a predetermined time;
transmitting or receiving the encrypted contents via a wireless network when transmission or reception of the contents is permitted; and
changing parameters of the wireless network, before measuring the round trip time, the parameters improving accuracy of the round trip time when the RTT measuring unit measures the round trip time,
wherein the wireless network is Bluetooth; and
the changing parameter changes at least one of a sniff interval expressing transmission and reception interval, a polling interval, transmission power and master-slave exchange prescribed by a standard of Bluetooth as parameters.

\* \* \* \* \*